(12) United States Patent
She et al.

(10) Patent No.: US 9,555,474 B2
(45) Date of Patent: Jan. 31, 2017

(54) HIGH TEMPERATURE FLUIDIZED BED FOR POWDER TREATMENT

(71) Applicant: United Technologies Corporation, Hartford, CT (US)

(72) Inventors: Ying She, East Hartford, CT (US); Aaron T. Nardi, East Grandby, CT (US); Michael A. Klecka, Coventry, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/911,211

(22) PCT Filed: Jul. 30, 2014

(86) PCT No.: PCT/US2014/048857
§ 371 (c)(1),
(2) Date: Feb. 9, 2016

(87) PCT Pub. No.: WO2015/023439
PCT Pub. Date: Feb. 19, 2015

(65) Prior Publication Data
US 2016/0175930 A1    Jun. 23, 2016

Related U.S. Application Data

(60) Provisional application No. 61/864,912, filed on Aug. 12, 2013.

(51) Int. Cl.
*B22F 1/00* (2006.01)
*B22F 3/00* (2006.01)
(Continued)

(52) U.S. Cl.
CPC ............. *B22F 1/0085* (2013.01); *B22F 1/02* (2013.01); *B22F 3/003* (2013.01); *C21D 1/53* (2013.01);
(Continued)

(58) Field of Classification Search
CPC combination set(s) only.
See application file for complete search history.

(56) References Cited

U.S. PATENT DOCUMENTS 3,615,187 A    10/1971    Suzukawa et al.
4,749,398 A     6/1988    Braun
(Continued)

FOREIGN PATENT DOCUMENTS

CH          664297 A5      2/1988
WO      WO87/00827 A1     2/1987
(Continued)

OTHER PUBLICATIONS

William T. Carter, Jr. et al., "Direct Laser Sintering of Metals", General Electric Corporate Research & Development Center, pp. 51-59.
(Continued)

*Primary Examiner* — Erma Cameron
(74) *Attorney, Agent, or Firm* — Kinney & Lange, P.A.

(57) ABSTRACT

A system comprises a furnace, a fluidized bed assembly and a powder bed. The fluidized bed assembly is positioned in the furnace and comprises an outer chamber having an outer chamber inlet for receiving gas, an inner chamber positioned inside of the outer chamber. The inner chamber comprises an inner chamber inlet in fluid communication with the outer chamber, and an outlet through which the gas may exit the inner chamber and the outer chamber. The powder bed is disposed in the inner chamber.

28 Claims, 3 Drawing Sheets

(51) Int. Cl.
*B22F 1/02* (2006.01)
*C21D 1/53* (2006.01)
*C21D 1/74* (2006.01)
*C23C 8/06* (2006.01)
*C23C 24/04* (2006.01)
*B33Y 10/00* (2015.01)
*B33Y 70/00* (2015.01)

(52) U.S. Cl.
CPC . *C21D 1/74* (2013.01); *C23C 8/06* (2013.01); *C23C 24/04* (2013.01); *B22F 3/008* (2013.01); *B22F 2201/10* (2013.01); *B22F 2999/00* (2013.01); *B33Y 10/00* (2014.12); *B33Y 70/00* (2014.12)

(56) References Cited

U.S. PATENT DOCUMENTS

| | | | |
|---|---|---|---|
| 4,813,653 A * | 3/1989 | Piepers | B01J 8/1818 266/251 |
| 5,073,358 A | 12/1991 | Shimizu et al. | |
| 5,194,228 A * | 3/1993 | Carlson | C21D 1/53 148/209 |
| 5,213,820 A | 5/1993 | Uhlemann et al. | |
| 5,423,370 A * | 6/1995 | Bonnemasou | B22D 29/003 164/132 |
| 5,976,456 A | 11/1999 | Ziani et al. | |
| 6,109,342 A | 8/2000 | Klaren | |
| 6,186,658 B1 | 2/2001 | Nishida et al. | |
| 6,251,158 B1 | 6/2001 | Dube et al. | |
| 6,811,765 B1 | 11/2004 | Maiwald et al. | |
| 7,141,207 B2 | 11/2006 | Jandeska, Jr. et al. | |
| 7,547,419 B2 | 6/2009 | Sprouse et al. | |
| 8,116,443 B1 | 2/2012 | Reese | |
| 8,192,792 B2 | 6/2012 | Haynes et al. | |
| 8,444,723 B2 | 5/2013 | Fujimori et al. | |
| 2006/0045787 A1 | 3/2006 | Jandeska, Jr. et al. | |
| 2007/0267784 A1 | 11/2007 | Greiner | |
| 2008/0102220 A1 * | 5/2008 | Haynes | C23C 4/12 427/421.1 |
| 2009/0011123 A1 * | 1/2009 | Bunting | B23P 6/007 427/142 |
| 2009/0047204 A1 * | 2/2009 | Kim | C01B 33/027 423/349 |
| 2009/0091049 A1 * | 4/2009 | Nielsen | B01J 2/16 264/12 |
| 2009/0095710 A1 * | 4/2009 | Kim | C01B 33/027 216/37 |
| 2009/0123665 A1 | 5/2009 | Zaima | |
| 2009/0297725 A1 * | 12/2009 | Reynoldson | C23C 8/80 427/535 |
| 2012/0328465 A1 | 12/2012 | Eder et al. | |
| 2016/0228918 A1 * | 8/2016 | She | B07B 4/00 |

FOREIGN PATENT DOCUMENTS

| | | | |
|---|---|---|---|
| WO | WO 95/30503 | * | 11/1995 |
| WO | WO03/004143 A1 | | 1/2003 |

OTHER PUBLICATIONS

M. Shellabear et al., "DMLS—Development History and State of the Art", Presented at Lane 2004 conference, Erlangen Germany, Sep. 21-24, 2004, 12 pages.

Extended European Search Report for EP Application No. 14836856.6, dated Aug. 22, 2016, 7 pages.

* cited by examiner

HIGH TEMPERATURE FLUIDIZED BED FOR POWDER TREATMENT

BACKGROUND

This invention relates generally to the field of additive manufacturing. In particular, the present disclosure relates to pre-treatment of powders used in additive manufacturing processes, such as with the use of fluidized beds.

Additive manufacturing is an established but growing technology. In its broadest definition, additive manufacturing is any layerwise construction or articles from thin layers of feed material. Additive manufacturing may involve applying liquid, layer, or particle material to a workstage, then sintering, curing, melting, and/or cutting to create a layer. The process is repeated up to several thousand times to construct the desired field finished component or article.

Often times it is necessary to pre-treat raw powder used in some of the additive manufacturing processes. Pre-treatment may include coating, degassing and heat treating the powder. The powder particles can be coated in order to prevent oxidation of the particles during the additive manufacturing process. For example, U.S. Pat. No. 7,141,207 discloses using a fluidized bed to apply a copper coating to aluminum powder.

Degassing can be used to remove water vapor from the powder particles. Surfaces of the powder can become oxidized very quickly during the manufacturing process when exposed to the environment. Water vapor can absorb into the oxide, which can cause voids in the material formed with the additive manufacturing process. Methods of removing water from the manufactured materials can cause the forming of hydrogen which can make the final material more brittle. Previous methods of removing water vapor from the powder include various methods of degassing. For example, U.S. Pat. No. 5,976,456 describes a degassing method using heating aluminum powder in a vacuum to very high temperatures. However, complications can occur with maintaining a very low pressure vacuum during the degassing.

Additionally, traditional methods of high temperature heat treatment of gases can cause unwanted sintering of the powder. For example, fluidized beds have been used in conjunction with heat treating of powder to prevent agglomeration, as discussed in U.S. Pat. No. 6,811,765. However, such a heat treating system is complex and costly to manufacture.

There is, therefore, a need for a simple, reliable and inexpensive system and method for pre-treating powders used in additive manufacturing processes.

SUMMARY

A system, such as can be used with an additive manufacturing process, comprises a furnace, a fluidized bed assembly and a powder bed. The fluidized bed assembly is positioned in the furnace and comprises an outer chamber having an outer chamber inlet for receiving gas, and an inner chamber positioned inside of the outer chamber. The inner chamber comprises an inner chamber inlet in fluid communication with the outer chamber, and an outlet through which the gas may exit the inner chamber and the outer chamber. The powder bed is disposed in the inner chamber.

A method of processing powder includes: introducing powder particles into an inner chamber, positioning the inner chamber inside of an outer chamber disposed within a furnace, supplying a gas to the outer chamber to surround the inner chamber, flowing the gas into the inner chamber, fluidizing the powder particles with the gas, and heat-treating the powder particles with the furnace.

DETAILED DESCRIPTION

Figure 1:
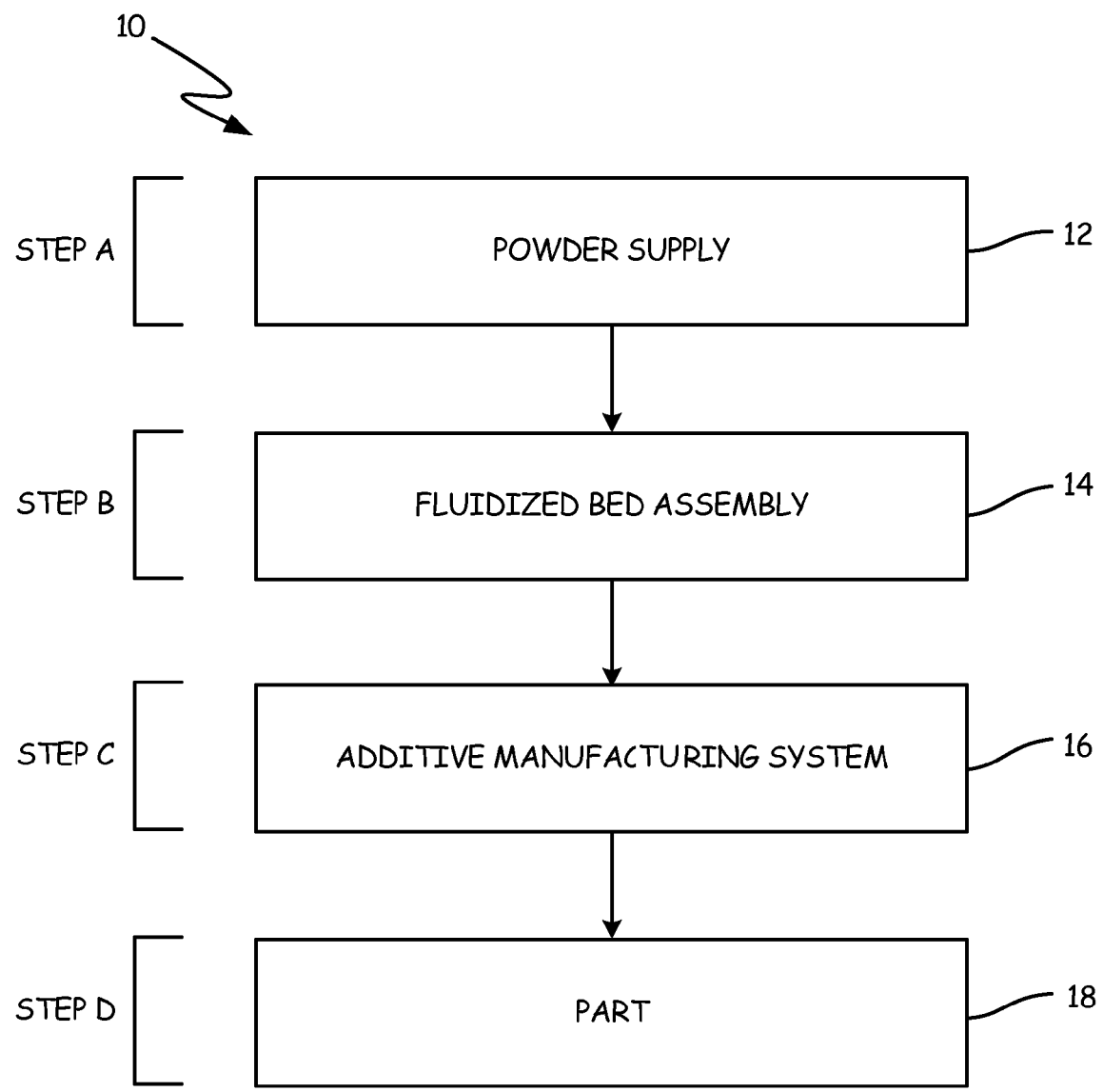
FIG. 1 is a schematic block diagram of an additive manufacturing process incorporating a fluidized bed assembly of the present disclosure.

FIG. 1 is a schematic block diagram of additive manufacturing process 10 incorporating a fluidized bed assembly of the present disclosure. Process 10 includes step A supplying powder using a powder supply 12; step B flowing particles through fluidized bed assembly 14 for treatment; step C executing an additive manufacturing process with the treated powder using additive manufacturing system 16; and step D producing an article of manufacture, such as part 18.

Powder from powder supply 12 flows through fluidized bed assembly 14. Fluidized bed assembly 14 alters mechanical properties of the powder to optimize the powder particles for manipulation with additive manufacturing system 16. For example, fluidized bed assembly 14 may heat-treat powder supply 12 at an extremely elevated temperature. Additive manufacturing system 16 selectively solidifies the optimized powder into part 18, which has a shape that is based on computer aided drafting (CAD) files that define part 18. In one embodiment, process 10 is used to produce components for gas turbine engines, such as blades for gas turbine engine turbines or compressors.

Supplying powder typically involves obtaining a quantity of powder of a desired metal, alloy or composite material. The powder will have certain mechanical properties, such as grain structure, as well as a distribution of powder sizes or diameters. The quantity of powder is positioned within a vessel inside fluidized bed assembly 14 to change the mechanical properties. More particularly, the powder forms a bed within the vessel through which a fluidizing gas is flowed to interact with the powder. The fluidizing gas is used to agitate the powder and may be used to treat the powder particles. Fluidized bed assembly 14 may be heated with a furnace to heat-treat the powder particles. The fluidizing gas flows out of the vessel after treatment is complete, and the treated powder can be used in an additive manufacturing process after removal from fluidized bed assembly 14. The vessel forms part of fluidized bed assembly 14 that is heated with an furnace to temper the metallic powder to the appropriate microstructure. Additive manufacturing system 16 carries out the additive manufacturing process to form part 18.

In some embodiments, additive manufacturing system 16 executes a cold spray deposition process. In such a process, the powder is not melted such that the microstructure of the powder particle before the deposition process remains the same after part 18 is formed. Thus, it becomes advantageous to manipulate the microstructure to a desirable state before the additive manufacturing process begins. In particular, cold spray deposition processes benefit from having powder particles that will deform well and that will bond well. Fluidized bed assembly 14 is placed in a furnace to heat-treat the powder to achieve the desired microstructure that facilitates deformation. In various embodiments, an inert gas, such as argon, can be used as the fluidizing gas. Simultaneously, the fluidizing gas can be used to clean the powder to facilitate bonding. Thus, in one embodiment, a hydrogen fluidizing gas can be used to remove oxides. In other embodiments, the fluidizing gas can be used to form a coating on the powder particles. For example, a nitrogen or boron coating can be applied to prevent the formation of oxidation.

Fluidized bed assembly 14 of the present disclosure can be a multi-walled fluidized bed utilizing an inner chamber that is shielded from the furnace by an outer chamber to allow the fluidizing gas to form a buffer zone around the inner chamber before entering the inner chamber. Thus, the inner chamber is not directly exposed to the high heat of the furnace and can be fabricated from less expensive materials, which reduces manufacturing costs associated with producing fluidized bed assembly 14. Additionally, fluidized bed assembly 14 of the present disclosure utilizes the fluidizing gas as an agitation source to prevent the metal powder from sintering while within the inner chamber inside the furnace at elevated temperatures. In yet other embodiments, the inner chamber can be shaped to assist in classifying the powder, e.g. removing undesirably sized particles from the bed.

Figure 2:
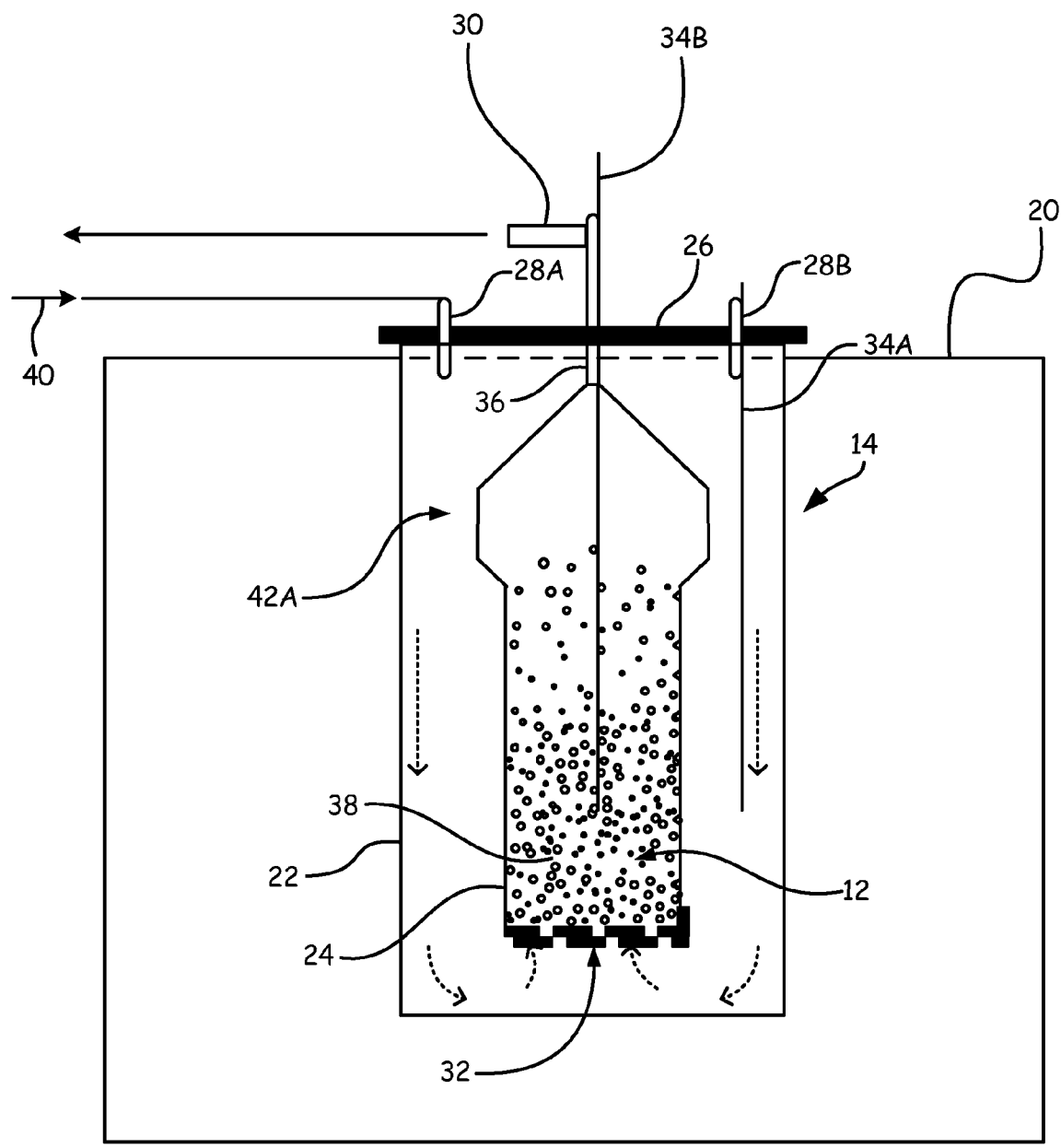
FIG. 2 is a schematic, cross-sectional view of an exemplary embodiment of a fluidized bed assembly in accordance with the present disclosure.

FIG. 2 is a schematic, cross-sectional view of an exemplary embodiment of fluidized bed assembly 14 in accordance with the present disclosure. Fluidized bed assembly 14 is disposed within furnace 20. Fluidized bed assembly 14 can be a multi-walled fluidized bed, including an outer chamber 22 and inner chamber 24, cap 26, first inlet 28A, second inlet 28B, outlet 30, plate 32, first temperature sensor 34A, second temperature sensor 34B and tube 36.

Furnace 20 comprises any furnace as is conventionally used in the art of fluidized bed technology. In various embodiments, furnace 20 comprises a box furnace or a tube furnace that can be loaded and unloaded via a top-end opening. In another embodiment, furnace 20 may simply comprise heaters wrapped around outer chamber 22. In another embodiment, furnace 20 may comprise an oven. In one embodiment, furnace 20 is capable of reaching internal temperature of over 1100° C. in order to carry out heat treating of powder 38.

Outer chamber 22 is mounted within furnace 20 in any suitable fashion. In one embodiment, outer chamber is fabricated from a ceramic material. Outer chamber 22 may, however, be fabricated from any material capable of withstanding high heat without oxidation. Cover 26 is releasably attached to outer chamber 22 such that inner chamber 24 can be accessed inside of outer chamber 22. In the disclosed embodiment, inner chamber 24, also known as a retort, is suspended from cover 26 so that space is provided between outer chamber 22 and the entirety of the exterior of inner chamber 24. In one embodiment, inner chamber 24 is suspended from tube 36 that connects inner chamber 24 to outlet 30, such that tube 36 acts as an outlet tube from inner chamber 24 that passes through outer chamber 22. In one embodiment, inner chamber 24 is fabricated from stainless steel, such as a 300 series stainless steel. Fluidized bed assembly 14 can be provided with multiple, interchangeable inner chambers 24 (not shown) for use with different powders or different thermal conditions. Each inner chamber can be reused and can be easily and inexpensively replaced if it becomes compromised during operation of fluidized bed assembly 14.

Powder 38 is positioned inside of inner chamber 24 and rests upon plate 32. Plate 32 is removable from inner chamber 24 so as to allow access to the interior of inner chamber 24 and the loading and unloading of powder 38. In another embodiment, powder 38 may be loaded into inner chamber 24 via tube 36 and may be evacuated from inner chamber 24 via passing a high velocity gas through plate 32 and tube 36 after processing.

Fluidizing gas 40 is directed to the interior of inner chamber 24 through inlets 28A and 28B. Fluidizing gas 40 is provided to inlets 28A and 28B by plumbing through furnace 20 of any suitable form. Fluidizing gas 40 is pressurized and surrounds inner chamber 24, including at plate 32. Plate 32 includes orifices or openings that permit fluidizing gas 40 to pass through plate 32. Fluidizing gas 40 percolates through powder 38 and leaves inner chamber 24 through tube 36 at outlet 30.

Fluidizing gas 40 performs several functions in processing powder 38. Primarily, fluidizing gas 40 serves as an agitation source that lifts particles of powder 38 off of plate 32 to prevent the powder from sintering, or agglomerating, within inner chamber 24 due to the heat of furnace 20. Due to the mass of each particle of powder 38, the particles drop back down to plate 32. To aid in this process, inner chamber 24 includes disengaging section 42A that increases the width, or, if circular, diameter, of inner chamber 24 to slow the velocity of fluidizing gas 40 near tube 36. This decreases the momentum of the particles to allow gravity to return them to plate 32. Thus, particles of powder 38 continuously circulate from plate 32, up toward tube 36 and back down to plate 32 as long as fluidizing gas 40 is passed through inner chamber 24.

Fluidizing gas 40 also forms a buffer around the exterior of inner chamber 24. Outer chamber 22 is heated from furnace 20 via convection, and inner chamber 24 is heated from outer chamber 22 via convection. Thus, inner chamber 24 is exposed to the same or nearly the same temperatures as outer chamber 22. Ordinarily, this would require inner chamber 24 to be fabricated from a material that can withstand exposure to such heat without being corrupted, e.g. melting or becoming oxidized to the point of being compromised. For example, in order to withstand temperatures required for heat treating nickel or titanium powder, e.g. 1100° C., the inner chamber would need to also be fabricated from a superalloy. However, in fluidized bed assembly 14, fluidizing gas 40 can be selected as an inert gas that removes oxygen from the surroundings of inner chamber 24. As such, inner chamber 24 is not exposed to oxidizing conditions. Inner chamber 24 can be fabricated from a material that is structurally strong enough, e.g. has a high melting temperature, to survive thermal conditions from furnace 20, but that is inexpensive to produce. Furthermore, inner chamber 24 can be produced from pre-fabricated, stock materials, such as a stock materials, such as a cylindrical tube. As mentioned, inner chamber 24 can be fabricated from stainless steel and fluidizing gas 40 can be selected as argon to prevent the stainless steel from oxidizing.

Additionally, fluidizing gas 40 can be used to treat powder 38. Specifically, fluidizing gas 40 can be selected as a scrubbing agent to clean the surfaces of the particles of powder 38 in order to facilitate the additive manufacturing process. For example, hydrogen can be used to remove oxides from the surfaces of powder 38. Fluidizing gas 40 can alternatively be selected as a coating agent that applies a thin layer over the surfaces of particles of powder 38. For example, nitrogen or boron can be used to form a thin layer around the particles of powder 38 to prevent the formation of oxidation.

Fluidizing gas 40 enters outer chamber 22 through inlets 28A and 28B and is heated as it moves towards plate 32. By the time fluidizing gas 40 enters inner chamber 24 it reaches a temperature sufficient to allow heat treating to occur. Within inner chamber 24, fluidizing gas 40 fluidizes powder 38 before passing through disengaging section 42A and entering tube 36. Tube 36 allows fluidizing gas 40 to cool before exiting fluidizing bed assembly 14. If fluidizing bed assembly 14 is configured such that fluidizing gas 40 will not reach temperatures sufficient for heat treating powder 38 while passing between outer chamber 22 and inner chamber 24, a preheater can be added to fluidized bed assembly 14 as shown in FIG. 3.

Figure 3:
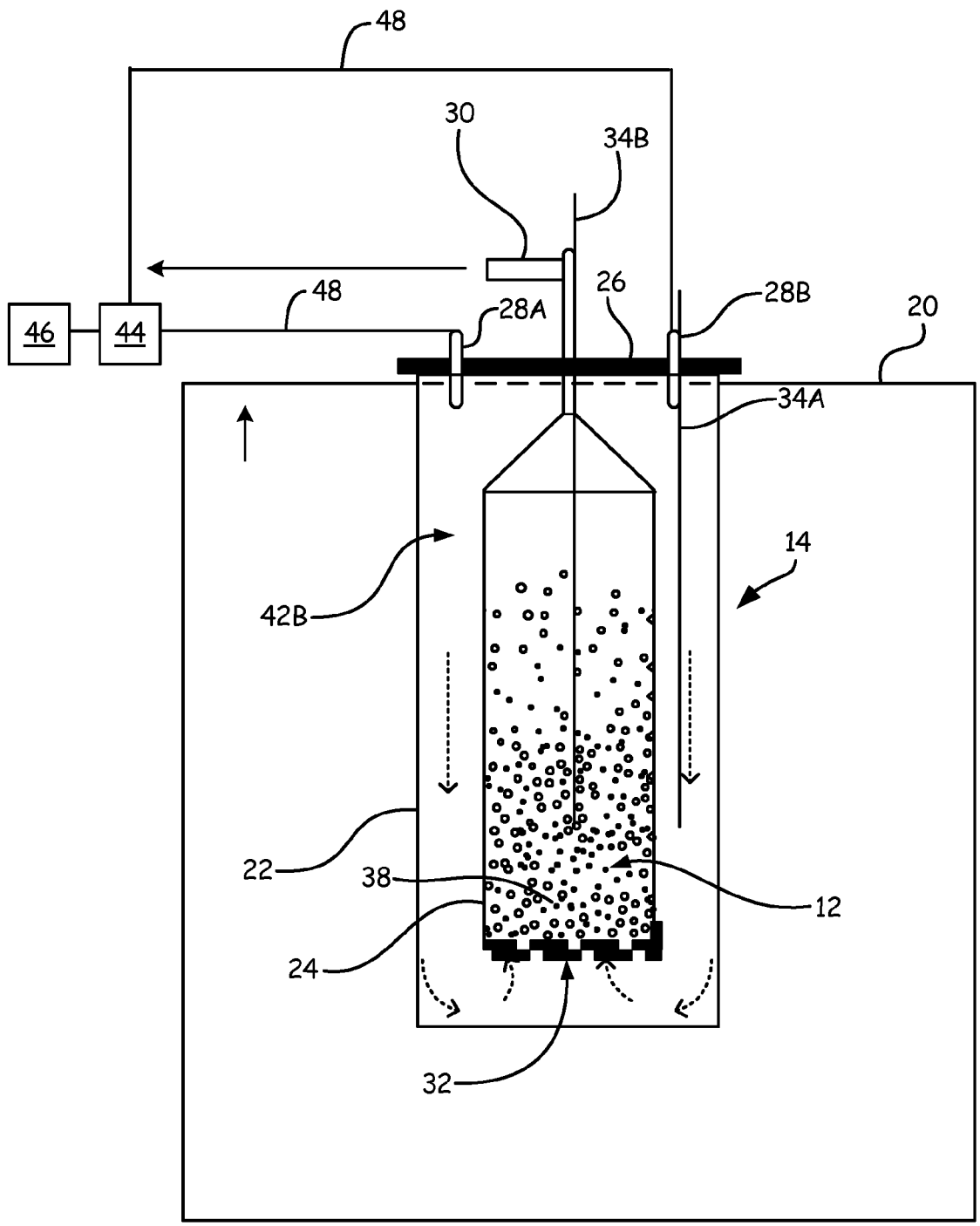
FIG. 3 is a schematic, cross-sectional elevation view of a second embodiment of a fluidized bed assembly in accordance with the present disclosure.

FIG. 3 is a schematic, cross-sectional elevation view of a second embodiment of fluidized bed assembly 14 in accordance with the present disclosure. Fluidized bed assembly 14 includes elements similar to those shown and discussed with reference to FIG. 2 and such elements are numbered correspondingly. However, in FIG. 3, disengaging section 42A of inner chamber 24 is replaced with disengaging section 42B, and inlets 28A and 28B are provided with pre-heater 44, which is supplied with gas from gas source 46.

Preheater 44 receives gas from gas source 46. Gas source 46 may also be used to supply gas to inlets 28A and 28B of FIG. 2. Preheater 44 heats fluidizing gas 40 to a temperature that will work in conjunction with heat from furnace 20 to allow fluidizing gas 40 to heat treat powder 38. For example, if outer chamber 22 forms too much of an insulating bather between the heat from furnace 20 and inner chamber 24, an additional source of heating may be desirable. Preheater 44 may comprise any suitable heater, such as electrical resistive heaters. In one embodiment, preheater 44 comprises an electric coil wrapped around inlet line 48 connecting gas source 46 and inlets 28A and 28B. In other embodiment, one or more preheaters 44 may be positioned proximate inlets 28A and/or 28B either inside or outside of outer chamber 22. Temperature sensors 34A and 34B are used to determine the temperature of gas 40 and powder 38, respectively, to monitor the heat treating process. Temperature sensors 34A and 34B may also be used to determine the need for and magnitude of heat from preheater 44.

As discussed with reference to FIG. 2, inner chamber 24 includes disengaging section 42A that is sized to slow the flow of fluidizing gas 40 through inner chamber 24 to allow powder particles to fall back down to plate 32. Disengaging section 42B is sized smaller than disengaging section 42A to slow the flow of fluidizing gas 40 less that disengaging section 42A. Thus, smaller sized particles will maintain an upward velocity that will carry the smaller sized particles into tube 36. Larger sized particles that are more favorable to the additive manufacturing process, such as cold spray deposition. Thus, disengaging section 42B can be used to assist in classifying the powder, e.g. removing undesirably sized particles from the bed. Conversely, disengaging section 42A can be sized to allow powder particles of all sizes to slow down and drop towards plate 32. Additive manufacturing process typically use metallic powders having sizes ranging from about 10 micrometers (µm) to larger than about 100 µm. It is useful to classify the particles into different categories for use with different additive manufacturing processes, different powder materials and other factors. Typical ranges for classifying metallic powder particles are 10 µm to 50 µm, 50 µm to 100 µm, and greater than 100 µm.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a furnace;
   a fluidized bed assembly positioned in the furnace, the fluidized bed assembly comprising:
      an outer chamber having an outer chamber inlet for receiving gas; and
      an inner chamber positioned inside of the outer chamber, the inner chamber comprising:
         an inner chamber inlet in fluid communication with the outer chamber; and
         an outlet through which the gas may exit the inner chamber and the outer chamber; and
      a powder bed disposed in the inner chamber.

2. The system according to claim 1, wherein a fluidizing gas source is connected to the outer chamber inlet to provide gas into the outer chamber.

3. The system according to claim 2, further comprising a preheater fluidly coupled between the gas source and the outer chamber inlet.

4. The system according to claim 1, wherein the inner chamber defines a fluidization section and a disengaging section.

5. The system according to claim 4, wherein a width of the disengaging section is equal to a width of the fluidization section.

6. The system according to claim 4, wherein a width of the disengaging section is greater than a width of the fluidization section.

7. The system according to claim 1, wherein the inner chamber is comprised of stainless steel.

8. The system according to claim 1, wherein the outer chamber is comprised of a high temperature alloy or a ceramic material.

9. The system according to claim 1, further comprising a temperature sensor positioned between the outer chamber and the inner chamber.

10. The system according to claim 1, further comprising a temperature sensor positioned within the inner chamber.

11. The system according to claim 1, wherein the inner chamber inlet comprises a perforated plate.

12. The system according to claim 1, further comprising a tube connecting an interior of the inner chamber with the outlet.

13. The system according to claim 1, wherein the outer chamber includes a removable cap that permits the inner chamber to be removed from the outer chamber.

14. A method of processing powder, the method comprising:
   introducing powder particles into an inner chamber,
   positioning the inner chamber inside of an outer chamber disposed within a furnace;

supplying a gas to the outer chamber to surround the inner chamber;

flowing the gas into the inner chamber;

fluidizing the powder particles with the gas; and heat-treating the powder particles with the furnace.

15. The method of processing powder of claim 14, further comprising:

forming an oxidizing barrier around the inner chamber with the gas, wherein the gas comprises an inert gas.

16. The method of processing powder of claim 14, further comprising:

performing an additive manufacturing process using the heat-treated powder particles.

17. The method of processing powder of claim 14, further comprising:

classifying the powder particles using a disengaging section of the inner chamber.

18. A fluidized bed assembly comprising:

an outer chamber, the outer chamber partially defined by a removable cap;

a fluid inlet connected to the outer chamber;

an inner chamber disposed within the outer chamber, the inner chamber partially defined by a perforated plate; and an outlet tube connected to the inner chamber and passing through the outer chamber.

19. The fluidized bed assembly of claim 18 wherein:

the inner chamber is comprised of stainless steel; and the outer chamber is comprised of at least one of a high temperature alloy capable of withstanding high heat without oxidation and a ceramic material.

20. The fluidized bed assembly of claim 18 wherein the inner chamber defines a classifying section.

21. A method comprising:

introducing a metallic powder into a multi-walled fluidizing bed;

heat-treating the metallic powder inside the multi-walled fluidizing bed by applying heat to the metallic powder;

removing the metallic powder from the multi-walled fluidizing bed; and performing an additive manufacturing process using the metallic powder.

22. The method of claim 21, wherein heat-treating the metallic powder comprises:

heating the multi-walled fluidizing bed, wherein the multi-walled fluidized bed includes an inner chamber in which the metallic powder is disposed, an outer chamber surrounding the inner chamber, and a fluid path extending from inside the outer chamber to inside the inner chamber and out of the multi-walled fluidizing bed.

23. The method of claim 22, wherein heat-treating the metallic powder further comprises:

positioning the multi-walled fluidizing bed in a furnace; and heating the multi-walled fluidizing bed with the furnace.

24. The method of claim 22, further comprising:

passing a gas between the inner chamber and the outer chamber before entering the inner chamber.

25. The method of claim 24, further comprising generating a coating on the metallic powder with the gas.

26. The method of claim 24, further comprising classifying the metallic powder with the multi-walled fluidizing bed.

27. The method of claim 21, wherein the metallic powder is heat-treated to a temperature at or above 1100° C.

28. The method of claim 21, wherein the additive manufacturing process comprises a cold spray deposition process.

* * * * *

UNITED STATES PATENT AND TRADEMARK OFFICE
CERTIFICATE OF CORRECTION

Page 1 of 1

PATENT NO. : 9,555,474 B2
APPLICATION NO. : 14/911211
DATED : January 31, 2017
INVENTOR(S) : Ying She, Aaron T. Nardi and Michael A. Klecka It is certified that error appears in the above-identified patent and that said Letters Patent is hereby corrected as shown below:

In the Specification

Column 5, Line 33:
Delete "bather"
Insert --barrier--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*